(12) United States Patent
Farré Guiu et al.

(10) Patent No.: US 9,912,974 B2
(45) Date of Patent: Mar. 6, 2018

(54) SHOT STRUCTURE OF ONLINE VIDEO AS A PREDICTOR OF SUCCESS

(71) Applicant: Disney Enterprises, Inc., Burbank, CA (US)

(72) Inventors: Miquel Á. Farré Guiu, Bern (CH); Seth Frey, Zurich (CH); Aljosa Aleksej Andrej Smolic, Aargau (CH); Michael R. Clements, Seattle, WA (US); Pablo Beltran Sanchidrian, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/057,455

(22) Filed: Mar. 1, 2016

(65) Prior Publication Data

US 2017/0257653 A1    Sep. 7, 2017

(51) Int. Cl.

| | |
|---|---|
| G06K 9/00 | (2006.01) |
| H04N 21/25 | (2011.01) |
| G06N 5/04 | (2006.01) |
| G06K 9/62 | (2006.01) |
| H04N 21/234 | (2011.01) |

(52) U.S. Cl.
CPC ....... *H04N 21/251* (2013.01); *G06K 9/00718* (2013.01); *G06K 9/6212* (2013.01); *G06K 9/6215* (2013.01); *G06K 9/6219* (2013.01); *G06N 5/04* (2013.01); *H04N 21/23418* (2013.01)

(58) Field of Classification Search
USPC ......... 382/165, 170, 181, 305; 1/1; 345/440, 345/473, 474, 475, E5.067; 358/453, 358/538; 455/404.1, 404.2, 456.3; 370/331; 707/999.1, E17.028; 709/223; 725/10, 46; 348/700
See application file for complete search history.

(56) References Cited

U.S. PATENT DOCUMENTS

| | | | | |
|---|---|---|---|---|
| 5,708,767 | A * | 1/1998 | Yeo ................... | G06F 17/30811 345/440 |
| 5,821,945 | A * | 10/1998 | Yeo ................... | G06F 17/30825 345/440 |
| 7,254,285 | B1 * | 8/2007 | Paek ................... | G06K 9/4685 358/453 |
| 7,949,050 | B2 * | 5/2011 | Xu ..................... | G06K 9/00765 348/700 |
| 8,020,183 | B2 * | 9/2011 | Ferman ............. | G06F 17/30017 709/223 |

(Continued)

OTHER PUBLICATIONS

U.S. Appl. No. 14/958,637, entitled "Contextual Video Shot Aggregation", filed Dec. 3, 2015.

(Continued)

*Primary Examiner* — Anh H Do
(74) *Attorney, Agent, or Firm* — Patterson + Sheridan, LLP (57) ABSTRACT

Systems, methods, and computer program products to perform an operation comprising receiving a plurality of superclusters that includes at least one of a plurality of shot clusters, wherein each of the shot clusters includes at least one of a plurality of video shots, and wherein each video shot includes one or more video frames, and computing an expected value for a metric based on the plurality of superclusters.

17 Claims, 4 Drawing Sheets

(56) References Cited

U.S. PATENT DOCUMENTS

| | | | | |
|---|---|---|---|---|
| 8,199,151 B2* | 6/2012 | Spencer | ............... | G06T 13/40 |
| | | | | 345/473 |
| 8,634,796 B2* | 1/2014 | Johnson | ............... | H04W 4/02 |
| | | | | 455/404.1 |
| 8,897,741 B2* | 11/2014 | Johnson | ............... | H04W 4/02 |
| | | | | 370/331 |
| 8,897,742 B2* | 11/2014 | Johnson | ............... | H04W 4/02 |
| | | | | 370/331 |
| 8,923,806 B2* | 12/2014 | Johnson | ............... | H04W 4/02 |
| | | | | 370/331 |
| 9,087,095 B2* | 7/2015 | Viehland | ............... | G06F 17/30312 |
| 9,104,658 B2* | 8/2015 | Unno | ............... | G06F 17/2735 |
| 9,113,295 B2* | 8/2015 | Johnson | ............... | H04W 4/02 |
| 9,456,303 B2* | 9/2016 | Johnson | ............... | H04W 4/02 |

OTHER PUBLICATIONS

U.S. Appl. No. 14/834,222, entitled "Visual Salience of Online Video as a Predictor of Success", filed Aug. 24, 2015.

\* cited by examiner

SHOT STRUCTURE OF ONLINE VIDEO AS A PREDICTOR OF SUCCESS

BACKGROUND

Field of the Disclosure

Embodiments disclosed herein relate to computer software. More specifically, embodiments disclosed herein relate to computer software that uses the shot structure of a video as a predictor of success of the video.

Description of the Related Art

Producers of video content need analytics that can predict the success of a video before it has been released. Unlike many "predictors" of video success that are not available until after video release, a video's own raw assets are an available source of data with rich potential to predict future success of the video. Consequently, predictive models based only on video content can add to business intelligence capabilities and aid decision makers in the production and distribution of media content. However, many existing pre-release analytics are based on subjective measures that may potentially bias the results.

SUMMARY

Embodiments disclosed herein include systems, methods, and computer program products to perform an operation comprising receiving a plurality of superclusters that includes at least one of a plurality of shot clusters, wherein each of the shot clusters includes at least one of a plurality of video shots, and wherein each video shot includes one or more video frames, and computing an expected value for a metric based on the plurality of superclusters.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques to predict the success of a video based on a structure of the video. The "structure" of the video may be based on the degree of relationship between the scenes (or shots) of a video. The "success" of the video may reflected by any quantifiable metric, such as how much (in time, percentage, etc.) of the video an average viewer may watch (also referred to as a survival rate), how many clicks the video may receive, a number of likes the video will receive, a number of users that will watch a different video promoted by the video (such as for movie trailers, television promotions, etc.), an amount of advertising revenue the video will generate, and the like.

In at least one embodiment, the structure of the video may be represented by a hierarchy, where the hierarchy represents relationships between the shots of the video. In such embodiments, the same shot may occur in multiple parts of the hierarchy. Each element of the hierarchy may therefore comprise a set of shots, shot clusters, and/or superclusters. One or more statistics may be produced for the hierarchy, where the statistics describe the relationships between each element of the hierarchy, or some property of the hierarchy and its elements. The statistic may then be used as input to a predictive algorithm that computes an expected value for a success metric, such as survival rates.

In one embodiment, the hierarchy of the video is represented by clusters and/or superclusters of shot clusters. To generate the clusters and superclusters, embodiments disclosed herein may leverage the techniques described in U.S. patent application Ser. No. 14/958,637, titled "Contextual Video Shot Aggregation," which is incorporated by reference herein in its entirety. Generally, such techniques may include dividing a video into a plurality of shots, where each shot includes one or more frames of video. Similarly, each shot may include one or more images. Further still, a shot may include frames and/or images. The plurality of shots may then be grouped into different "clusters" based on similarities between the content of each shot. The clusters may include shots that are not contiguous temporally in a video. For example, a first cluster may include two shots of video with frames depicting a news anchorman, even though the two frames of video may not be contiguous frames of the video. However, the two shots may be placed in the same cluster based on the similarities of the content (e.g., the anchorman, the set, the angle, and the like). Once the clusters are determined, the clusters may be grouped into "superclusters," where a supercluster includes one or more interacting clusters. The interacting clusters in a supercluster may include a temporally connected list of shots (such as the back-and-forth shots of two individuals having a conversation in a video). However, the interacting clusters in a supercluster may also include groups of shots that are not temporally connected, but rather are semantically connected, such as the anchormen that appear at different points in a news program.

Embodiments disclosed herein may predict the success of the video based on one or more predictive models applied to the hierarchy. As previously indicated, in at least one embodiment, the hierarchy may be represented by the clusters and superclusters of the video. Therefore, in one embodiment, a first predictive model may consider attributes of the superclusters. More specifically, the first predictive model may compute a ratio of the number of superclusters with 1, 2, or 3 clusters to the total number of superclusters. This ratio can be used in a predictive model to improve predictions of the success of a video. In one example, as the ratio nears 1, the more likely the video is to have success relative to a given success metric. Similarly, in this example, as the ratio nears zero, the less likely the video is going to have success relative to the given success metric. In some embodiments, the computed ratio may be provided as input to a predictive algorithm which may return an expected value for the success metric (e.g., survival rates, etc.).

In a second model, the clustering algorithm described above may be modified to create clusters with a varying range of thresholds, varying from more restrictive to less restrictive. The clustering algorithm described above automatically determines the best shot-grouping threshold to create clusters. The shot-grouping threshold may be a threshold value that determines whether shots are related, and should therefore belong to the same cluster. However, embodiments disclosed herein may vary the threshold from more restrictive to less restrictive in successive iterations until each cluster is a member of a single supercluster. The number of iterations of the overall algorithm required to produce a single supercluster that includes all clusters may be referred to herein as the "hierarchy depth." The hierarchy depth may be negatively correlated with success, as more iterations of the clustering algorithm may mean that the shots of the video are not closely related. If the shots of the video were more closely related, then fewer iterations of the clustering algorithm would be required, as the more restrictive threshold would group the shots of the video to the same cluster or supercluster based on the attributes of the video. However, when more iterations are needed, it may be determined that the shots of the video are not related, as the less restrictive clustering threshold is required to group shots in the same cluster or supercluster. Again, in some embodiments, the hierarchy depth may be provided as input to a predictive algorithm which may return an expected value for the success metric (e.g., survival rates, etc.).

Although videos are used as a reference example, the techniques disclosed herein may be applied equally to all types of media, such as images and audio. For example, embodiments disclosed herein may build a hierarchy of the musical measures of a song, and use the resulting metrics to predict the popularity of that song. Furthermore, although clusters and superclusters are used as a reference example for a hierarchy that describes the relationships between shots in a video, any suitable algorithm may be used to generate a hierarchy that describes the relationships between the shots of a video, and the use of clusters and superclusters should not be considered limiting of the disclosure.

Figure 1:
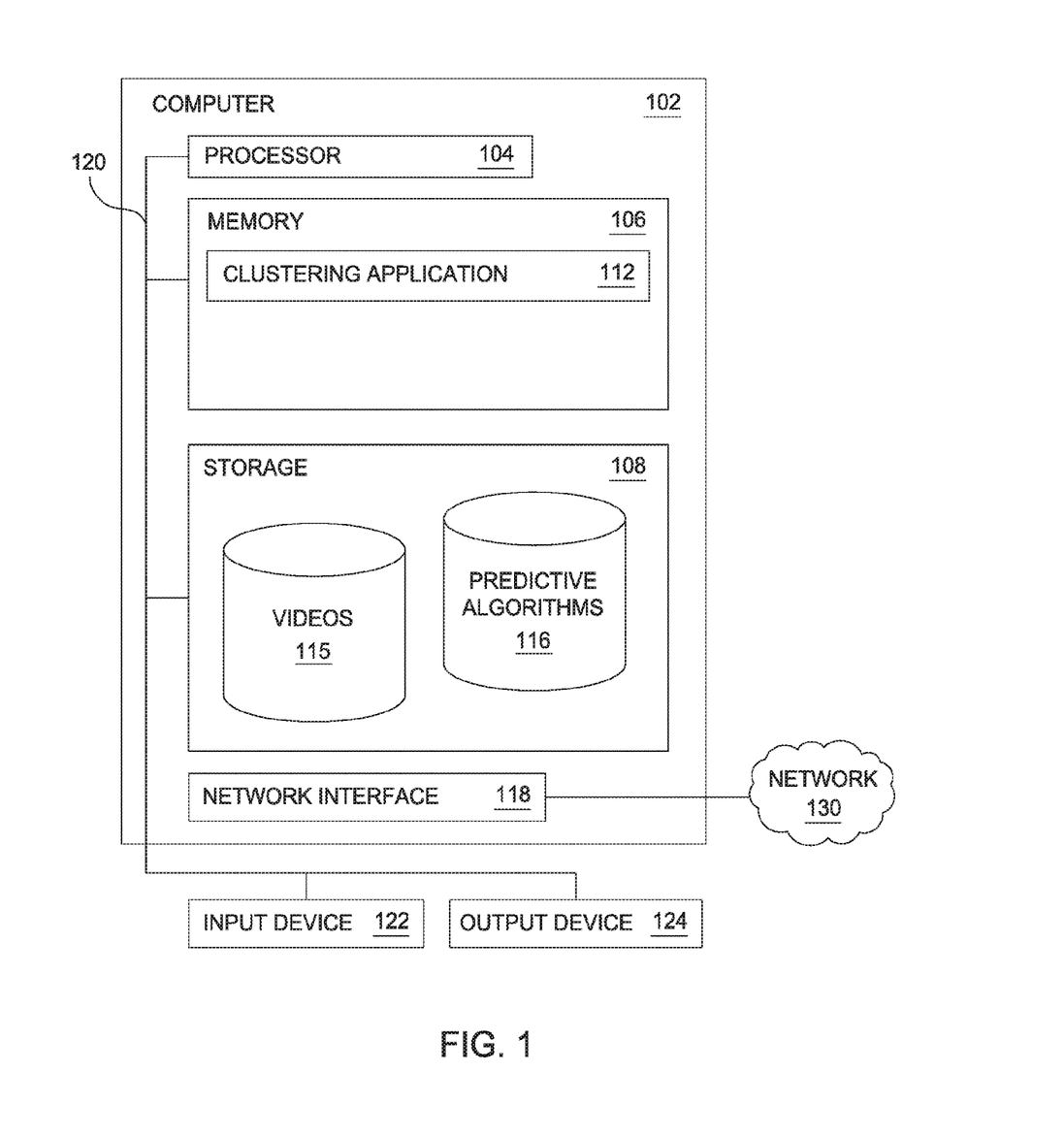
FIG. 1 is a block diagram illustrating a system configured to use the shot structure of a video as a predictor of success, according to one embodiment.

FIG. 1 is a block diagram illustrating a system 100 configured to use the shot structure of a video as a predictor of success, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains the clustering application 112, which is generally configured to use the shot structure of a video as a predictor of success. More specifically, the clustering application 112 may receive a request to predict the success of a video in the videos 115. The clustering application 112 may divide the video 115 into video shots based on one or more metadata attributes of each frame of video. A "video shot" may include one or more frames of video. The clustering application 112 may then generate a hierarchy based on the shots of the video. In at least one embodiment, the hierarchy is represented by clusters and superclusters. Therefore, in one embodiment, the clustering application 112 may then group shots together into clusters based on similarities between each shot. The clustering application 112 may apply a grouping algorithm to identify related shots based on grouping parameters, which may include the minimum number of video shots necessary to be considered a video shot cluster, and the maximum reachable distance between the video shots. The maximum reachable distance may be related to the content of the video shots and can be, for example, a color distance, a distance between the similarity of the people in the video shots, and/or other computer vision features such as scale-invariant feature transform (SIFT) or speeded up robust features (SURF). One example of a grouping algorithm includes density-based spatial clustering of applications with noise (DBSCAN). The clustering application 112 may generally extract a plurality of metadata attributes, or features, of each video 115. The clustering application 112 may leverage the extracted metadata and features when creating clusters and superclusters. Example metadata and features include, objects in a frame (or keyframe) of video, dominant objects in a frame or keyframe, or any other attribute of the video.

Once the clustering application 112 creates clusters of video shots, the clustering application 112 may then create superclusters based on relationships between each cluster, such as temporal relationships or other interactions between clusters. For example, a video 115 may include a conversation between two people, person A and person B, where the video focuses on each person as they are speaking. For such a video, the clustering application 112 may create a first cluster including the frames (or shots) of video that depict person A, and a second cluster including the frames (or shots) of video that depict person B. The clustering application 112 may then group the first and second clusters into a single supercluster, as the first and second clusters are temporally related, and include interactions between the shots of each cluster.

Based on this analysis, the clustering application 112 may then apply a first model compute a statistic for the video. The statistic which may then be used as input to a predictive algorithm. In one embodiment, the statistic may classify the superclusters by the number of clusters they contain. In one embodiment, the statistic may be computed based on the following ratio:

$$\frac{\text{Number of superclusters with 1, 2 or 3 clusters}}{\text{Number of superclusters (with any number of clusters)}}$$

The ratio returns a normalized value (a statistic) that is greater than zero and less than or equal to 1. The result is positively correlated with the success of a video. As used herein, "correlated" or "correlation" generally refers to the degree to which a model (or other algorithm) predicts the success of a video. In some embodiments, the clustering application 112 may provide the statistic as input to a predictive algorithm 116, which may return an expected value for one or more success metrics.

In another embodiment, the clustering application 112 may vary the clustering threshold applied to the maximum reachable distance between two video shots to determine whether the video shots belong in the same cluster. The clustering application 112 may also set the minimum number of video shots necessary to be considered as a video shot cluster to 1. The clustering application 112 may start with a more restrictive threshold for clustering based on maximum reachable distance, and move towards a less restrictive threshold, until the clusters are placed into a single supercluster. For each threshold, starting with the more restrictive threshold, the clustering application 112 may determine the clusters of video shots using the current threshold. Initially, the video shots would need to be more closely related to be grouped in the same cluster (based on the higher threshold for similarity). The clustering application 112 may then group the clusters into superclusters. The clustering application 112 may then flag clusters so that elements that belong to a given supercluster belong to the same supercluster in a subsequent iteration. The clustering application 112 may then relax the shot clustering threshold, and repeat the clustering and superclustering process. The clustering application 112 repeats these operations until all shots belong to the same supercluster. The clustering application 112 may also determine the number of iterations, which is the hierarchy depth (and the statistic in this embodiment). The hierarchy depth is negatively correlated with the success of a video. For example, a video having a hierarchy depth of 2 is more likely to be successful than a video having a hierarchy depth of 10. In some embodiments, the clustering application 112 may provide the hierarchy depth as input to a predictive algorithm 116, which may return an expected value for one or more success metrics.

More generally, the clustering application 112 may consider other statistics based on attributes of the videos as input to the predictive algorithm 116. For example, the clustering application 112 may consider the following ratio:

$$\frac{\text{Number of shots of main "anchor"}}{\text{Number of shots in the video}}$$

This ratio may generally consider the number of times a video has a shot of an "anchor," such as the shot of an anchorperson in a news broadcast, relative to the total number of shots in the video. This ratio may be positively correlated with success. Generally, an "anchor" may correspond to a set of shots in a supercluster that have the most screen time in a video, akin to the anchor reporter during the news broadcast that appears and reappears frequently over the duration of the news broadcast.

As another example, the clustering application 112 may consider the following ratio, and provide the result as input to a predictive algorithm 116:

$$\frac{\text{Average number of shots per supercluster}}{\text{Total number of shots in the video}}$$

This ratio considers the average number of shots per supercluster to the number of shots in the video. This ratio may be positively correlated with success. As another example, the clustering application 112 may consider the following ratio, and provide the result as input to a predictive algorithm 116:

$$\frac{\text{Number of total shots in video}}{\text{Number of total clusters in video}}$$

As shown, this ratio considers the number of total shots in the video relative to the total number of clusters in the video. As another example, the clustering application 112 may consider the following ratio, and provide the result as input to a predictive algorithm 116:

$$\frac{\text{Number of total shots in video}}{\text{Number of total superclusters in video}}$$

As shown, this ratio considers the number of total shots in the video relative to the total number of superclusters in the video. This ratio may be positively correlated with success. As another example, the clustering application 112 may consider the following ratio, and provide the result as input to a predictive algorithm 116:

$$\frac{\text{Number of clusters}}{\text{Video length}}$$

This ratio considers the number of clusters in a video relative to the length of the video. As another example, the clustering application 112 may consider the following ratio, and provide the result as input to a predictive algorithm 116:

$$\frac{\text{Number of superclusters with one shot}}{\text{Number of superclusters}}$$

This ratio considers the number of superclusters with only one shot relative to the total number of superclusters. This ratio may be negatively correlated with success. Further still, the clustering application 112 may consider one or more of the number of shots in a video and the number of superclusters with one shot. More generally, the clustering application 112 may consider any number of the above-mentioned attributes and ratios when determining the likelihood of success of a metric.

As shown, the storage 108 includes the videos 115 and the predictive algorithms 116. The videos 115 includes a plurality of video files. The videos 115 may be any type of video content, television programs, movies, sporting events, and the like. Each video in the videos 115 may be enriched with the metadata and/or features extracted by the clustering application 112. The predictive algorithms 116 include any type of algorithm that produces an output of an expected value for a performance metric. Examples of predictive algorithms 117 include survival functions (such as Kaplan-Meier survival functions), hazard functions, linear regressions, multiple regressions, other models in the general linearized model, machine learning models, and statistical learning models. The predictive algorithms 116 may take, as input, the supercluster ratio computed by the clustering application 112, the hierarchy depth, or both.

Figure 2:
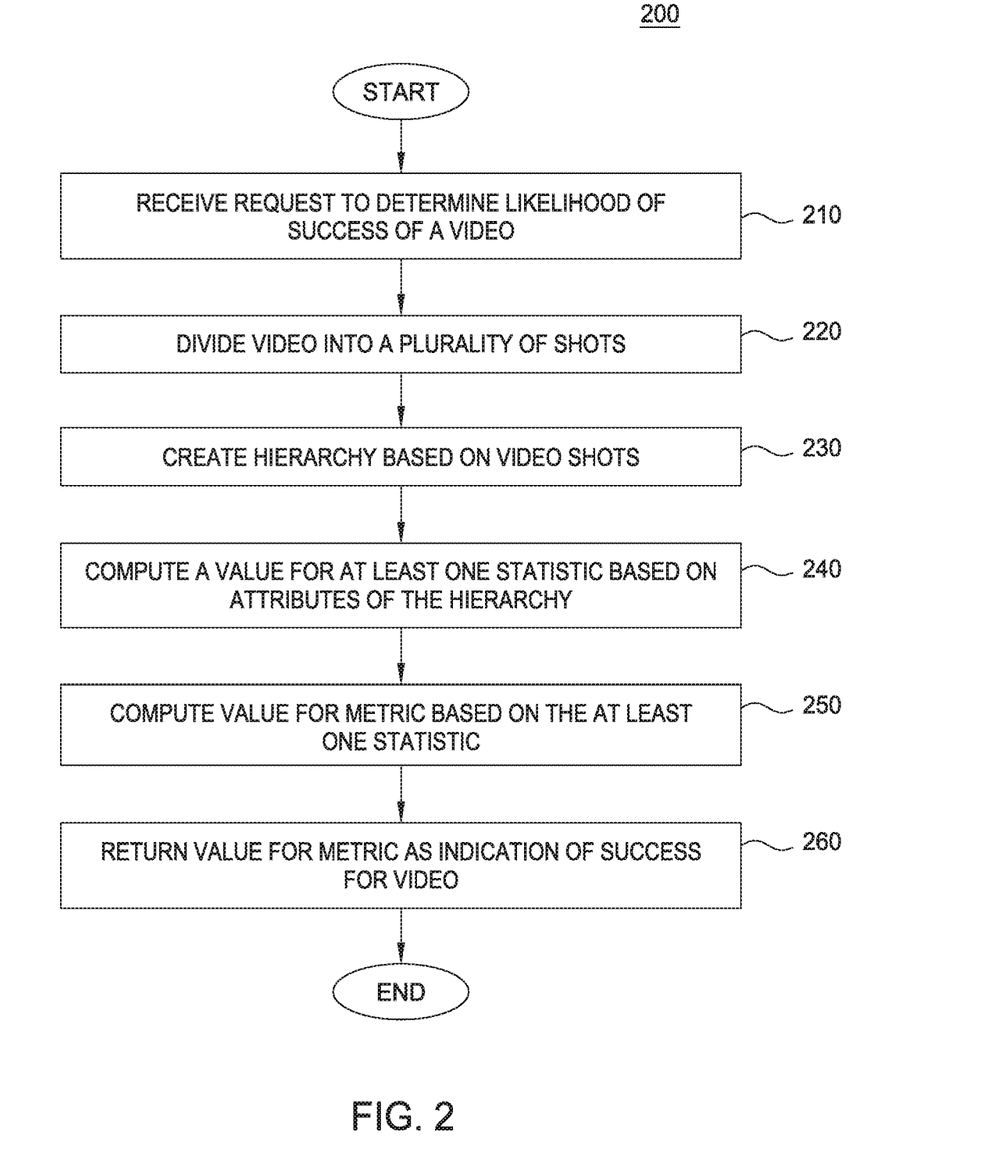
FIG. 2 is a flow chart illustrating a method to use the shot structure of a video as a predictor of success, according to one embodiment.

FIG. 2 is a flow chart illustrating a method 200 to use the shot structure of a video as a predictor of success, according to one embodiment. As shown, the method 200 begins at block 210, where the clustering application 112 receives a user request to determine the likelihood of success for a video. At block 220, the clustering application 112 may divide the video into a plurality of shots based on one or more attributes of each frame of video. At block 230, the clustering application 112 may generate a hierarchy based on the video shots. Generally, the hierarchy is an organization of shot relationships that can be based on high level features such as places, faces, or actions, and low level features such as color or SURF points. In at least one embodiment, the hierarchy is a tree where the shots are the leaves and there is a unique root. In at least one embodiment, to create the hierarchy, shots are grouped based on similarities. In such embodiments, very similar shots are grouped close to the leaf. Similarly, upper levels of the hierarchy to the root may be built in multiple ways. In one embodiment, the hierarchy to the root may be built by relaxing the parameters of the features that are used to build the first level of the hierarchy. In another embodiment, different features are used at each level of the hierarchy.

In at least one embodiment, to create the hierarchy, the clustering application 112 may first generate a plurality of video shot clusters based on similarities between metadata attributes and/or features of the plurality of video shots. The clustering application 112 may apply the DBSCAN algorithm to create the shot clusters. The clustering application 112 may then group the video shot clusters into one or more superclusters based at least in part on temporal relationships between the clusters, where the superclusters represent the hierarchy.

At block 240, the clustering application 112 may compute a value for at least one statistic based on the attributes of the hierarchy. For example, a first statistic for the video may be based on the number of clusters in each supercluster. As previously indicated, in one embodiment, the clustering application 112 may determine a ratio (statistic) of the superclusters having 1, 2, or 3 clusters to the number of superclusters having 1, 2, 3, or more clusters, where the ratio is positively correlated with success. As another example of a statistic, described in greater detail with reference to FIG. 3, the clustering application 112 may determine the hierarchy depth, where the hierarchy depth is negatively correlated to success. At block 250, the clustering application 112 may compute a value for a predictive metric based on the at least one statistic provided as input to at least one predictive algorithm. For example, the clustering application 112 may provide the computed ratio, hierarchy depth, or both to a predictive algorithm. The predictive algorithm may then return a value as an expected value for the success of the video relative to some metric. At block 260, the clustering application 112 may return the value computed at block 250 as an indication of the success of the video. For example, the clustering application 112 may output a value for a requested metric (e.g., survival time, clickthroughs, etc.) computed by a predictive algorithm.

Figure 3:
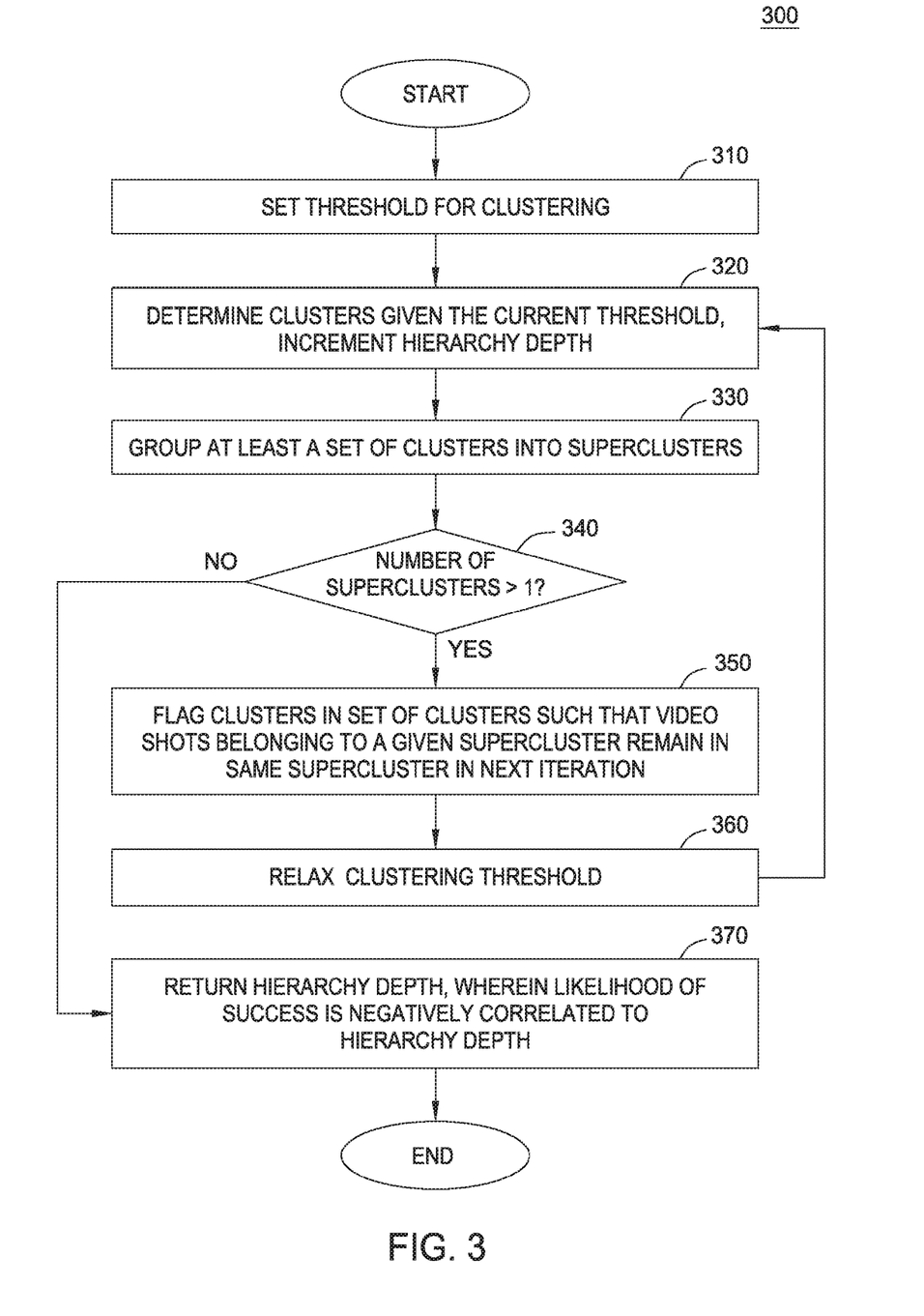
FIG. 3 is a flow chart illustrating a method to determine a likelihood of success of a video based on a hierarchy depth, according to one embodiment.

FIG. 3 is a flow chart illustrating a method 300 to determine a likelihood of success of a video based on a hierarchy depth, according to one embodiment. Generally, the method 300 modifies the standard clustering and superclustering techniques applied by the clustering application 112 to cluster shots together based restrictive clustering thresholds in early iterations of the method 300, while moving to less restrictive clustering thresholds in subsequent iterations of the method 300. The hierarchy depth may be a statistic computed by the clustering application 112 and used as input to a predictive algorithm to predict a success of the video.

As shown, the method 300 begins at block 310, where the clustering application 112 sets an initial clustering threshold. The clustering threshold may be relative to a maximum reachable distance between two or more video shots. At block 320, the clustering application 112 may generate a plurality of shot clusters given the current clustering threshold, and increment the hierarchy depth. At block 330, the clustering application 112 may group at least a set of the clusters into one or more superclusters. At block 340, the clustering application 112 may determine whether the number of superclusters generated at step 330 is greater than 1. If the number of superclusters is not equal to 1, the clustering application 112 proceeds to block 350, where the clustering application flags clusters in the set of clusters such that the video shots belonging to a given supercluster remain in that supercluster in the next iteration. At block 360, the clustering application 112 may relax the clustering threshold (e.g., reduce the threshold value). The clustering application 112 may then return to step block to repeat the clustering and superclustering process. Returning to step 340, if the number of superclusters not greater than one, the clustering application 112 proceeds to block 370, as all clusters are in a supercluster. At step 370, the clustering application 112 returns the hierarchy depth. As previously indicated, the hierarchy depth improves predictions of the success of a video, and the hierarchy depth may be negatively correlated with the success of the video.

Figure 4:
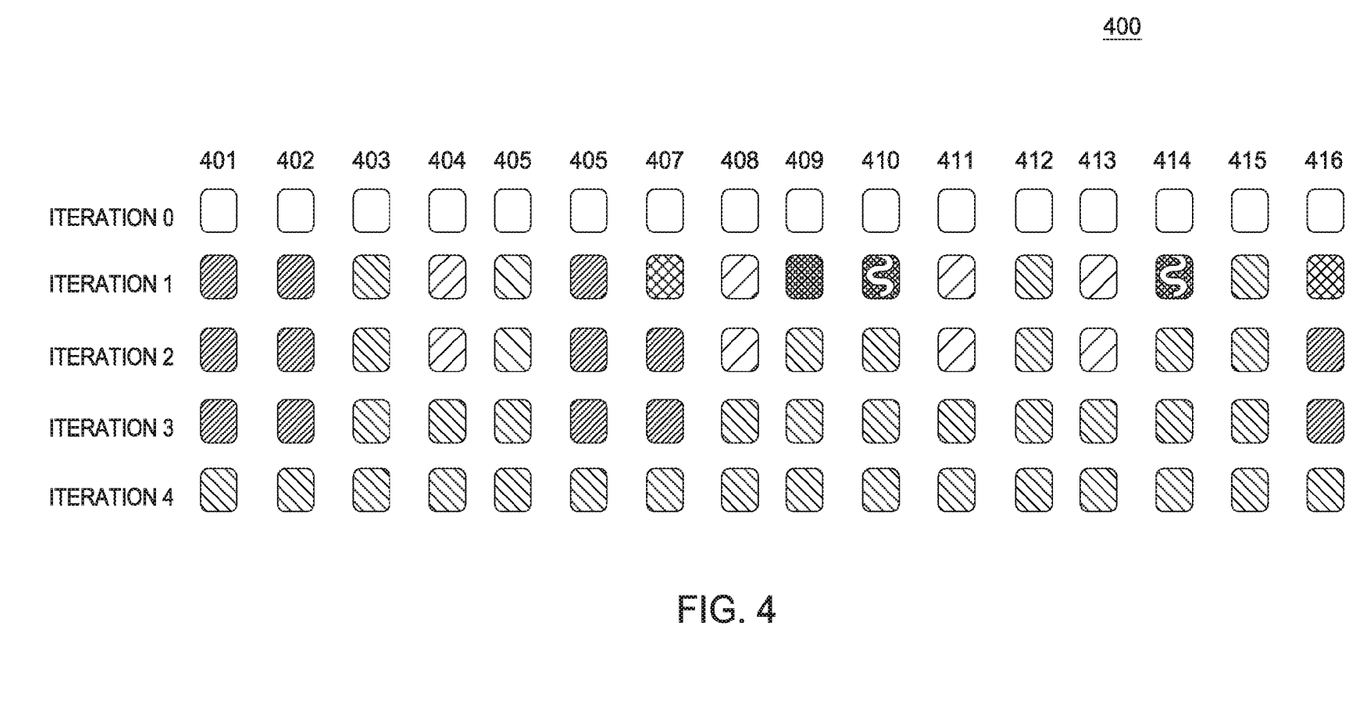
FIG. 4 illustrates an example of determining a likelihood of success of a video based on a hierarchy depth, according to one embodiment.

FIG. 4 illustrates an example representation of determining a likelihood of success of a video based on a hierarchy depth, according to one embodiment. As shown, FIG. 4 includes a table 400 of a plurality of shot clusters 401-416. Each shot cluster 401-416 is shaded according to a shading representing to each of a plurality of example superclusters. Each row of the table 400 corresponds to the supercluster membership of each shot cluster 401-416 in a given iteration of the method 300. The shot clustering threshold is greatest (or strongest) in iteration 0, and is least (or weakest) in iteration 4. As shown, the shot clusters 401-416 belong to different superclusters in iterations 0-3. However, in iteration 4, all shot clusters 401-416 belong to the same supercluster. Therefore, the hierarchy depth of the video represented in FIG. 4 is 5.

Embodiments disclosed herein analyze the relationships between shots and scene in a video to automatically determine the likelihood of success for the video relative to any number of success metrics. Advantageously, this automated process allows users to create videos that are more likely to succeed before releasing the videos to the public.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the clustering application 112 could execute on a computing system in the cloud and determine a likelihood of success for a video. In such a case, the clustering application 112 could compute a supercluster ratio or hierarchy depth and store these values at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a plurality of video shots of a video, wherein each video shot includes one or more frames of the video;
   generating a hierarchy based on the plurality of video shots, wherein the hierarchy comprises a plurality of superclusters that include at least one of a plurality of shot clusters, wherein the hierarchy describes relationships between the plurality of video shots, wherein each of the shot clusters includes at least one of the plurality of video shots;
   computing a value for a statistic for the video based on the hierarchy, wherein the statistic comprises a ratio of a count of the plurality of superclusters having less than four of the plurality of shot clusters to a total count of the plurality of superclusters; and
   computing, by operation of a computer processor, an expected value for a metric based on the statistic.

2. The method of claim 1, wherein the expected value for the metric is positively correlated to the ratio.

3. The method of claim 1, wherein statistic further comprises a number of iterations of a clustering algorithm applied to the plurality of video shots resulting in one of the plurality of superclusters including each of the plurality of shot clusters, wherein the expected value for the metric is negatively correlated to the number of iterations, wherein a first iteration of the clustering algorithm applies a more restrictive clustering threshold than a second iteration of the clustering algorithm.

4. The method of claim 3, wherein the clustering algorithm comprises:
   defining the clustering threshold for a current iteration;
   generating the plurality of shot clusters based on the clustering threshold; and
   assigning each shot cluster in a set of shot clusters, of the plurality of shot clusters, to a respective supercluster of the plurality of the plurality of superclusters, wherein each shot cluster in the set of shot clusters remains in the respective supercluster in a subsequent iteration of the clustering algorithm.

5. The method of claim 1, further comprising prior to computing the expected value:
   generating the plurality of video shots from the video;
   generating the plurality of shot clusters based on similarities between the video shots, wherein the similarities between the video shots include at least one of showing a same person, showing a same place, and a same low level feature including at least one of a similar color and a similar low level geometry descriptor; and
   generating the plurality of superclusters based on interactions between the plurality of shot clusters.

6. The method of claim 1, wherein the expected value for the metric is computed responsive to a user request to return the expected value for the metric, wherein a predictive algorithm is configured to compute the expected value for the metric, wherein the metric comprises at least one of: (i) a number of views the video will receive, (ii) a number of likes the video will receive, (iii) a duration of the video a user will watch, (iv) a number of users that will watch a second video promoted by the video, (v) a likelihood that a user will click a link to an advertisement in the video, (vi) a likelihood that a user will stop watching the video at each second of the video, and (vii) an expected amount of advertising revenue the video will generate.

7. A computer program product, comprising:
   a non-transitory computer-readable storage medium having computer-readable program code embodied therewith, the computer-readable program code executable by a processor to perform an operation comprising:
      receiving a plurality of video shots of a video, wherein each video shot includes one or more frames of the video;
      generating a hierarchy based on the plurality of video shots, wherein the hierarchy comprises a plurality of superclusters that include at least one of a plurality of shot clusters, wherein the hierarchy describes relationships between the plurality of video shots, wherein each of the shot clusters includes at least one of the plurality of video shots;
      computing a value for a statistic for the video based on the hierarchy, wherein the statistic comprises a number of iterations of a clustering algorithm applied to the plurality of video shots resulting in one of the plurality of superclusters including each of the plurality of shot clusters; and computing an expected value for a metric based on the statistic.

8. The computer program product of claim 7, wherein the statistic further comprises a ratio of a count of the plurality of superclusters having less than four of the plurality of shot clusters to a total count of the plurality of superclusters, wherein the expected value for the metric is positively correlated to the ratio.

9. The computer program product of claim 7, wherein the expected value for the metric is negatively correlated to the number of iterations, wherein a first iteration of the clustering algorithm applies a more restrictive clustering threshold than a second iteration of the clustering algorithm.

10. The computer program product of claim 9, wherein the clustering algorithm comprises:
    defining the clustering threshold for a current iteration;
    generating the plurality of shot clusters based on the clustering threshold; and
    assigning each shot cluster in a set of shot clusters, of the plurality of shot clusters, to a respective supercluster of the plurality of the plurality of superclusters, wherein each shot cluster in the set of shot clusters remains in the respective supercluster in a subsequent iteration of the clustering algorithm.

11. The computer program product of claim 7, further comprising prior to computing the expected value:
    generating the plurality of video shots from the video;
    generating the plurality of shot clusters based on similarities between the video shots, wherein the similarities between the video shots include at least one of showing a same person, showing a same place, and a same low level feature including at least one of a similar color and a similar low level geometry descriptor; and
    generating the plurality of superclusters based on interactions between the plurality of shot clusters.

12. The computer program product of claim 7, wherein the expected value for the metric is computed responsive to a user request to return the expected value for the metric, wherein a predictive algorithm is configured to compute the expected value for the metric, wherein the metric comprises at least one of: (i) a number of views the video will receive, (ii) a number of likes the video will receive, (iii) a duration of the video a user will watch, (iv) a number of users that will watch a second video promoted by the video, (v) a likelihood that a user will click a link to an advertisement in the video, (vi) a likelihood that a user will stop watching the video at each second of the video, and (vii) an expected amount of advertising revenue the video will generate.

13. A system, comprising:
    a processor; and
    a memory containing a program which when executed by the processor performs an operation comprising:
        receiving a plurality of video shots of a video, wherein each video shot includes one or more frames of the video;
        generating a hierarchy based on the plurality of video shots, wherein the hierarchy comprises a plurality of superclusters that include at least one of a plurality of shot clusters, wherein the hierarchy describes relationships between the plurality of video shots, wherein each of the shot clusters includes at least one of the plurality of video shots;
        computing a value for a statistic for the video based on the hierarchy, wherein the statistic comprises a ratio of a count of the plurality of superclusters having less than four of the plurality of shot clusters to a total count of the plurality of superclusters; and
        computing an expected value for a metric based on the statistic.

14. The system of claim 13, wherein the wherein the expected value for the metric is positively correlated to the ratio.

15. The system of claim 13, wherein statistic further comprises a number of iterations of a clustering algorithm applied to the plurality of video shots resulting in one of the plurality of superclusters including each of the plurality of shot clusters, wherein the expected value for the metric is negatively correlated to the number of iterations, wherein a first iteration of the clustering algorithm applies a more restrictive clustering threshold than a second iteration of the clustering algorithm.

16. The system of claim 15, wherein the clustering algorithm comprises:
    defining the clustering threshold for a current iteration;
    generating the plurality of shot clusters based on the clustering threshold; and
    assigning each shot cluster in a set of shot clusters, of the plurality of shot clusters, to a respective supercluster of the plurality of the plurality of superclusters, wherein each shot cluster in the set of shot clusters remains in the respective supercluster in a subsequent iteration of the clustering algorithm.

17. The system of claim 13, further comprising prior to computing the expected value:
    generating the plurality of video shots from the video;
    generating the plurality of shot clusters based on similarities between the video shots, wherein the similarities between the video shots include at least one of showing a same person, showing a same place, and a same low level feature including at least one of a similar color and a similar low level geometry descriptor; and
    generating the plurality of superclusters based on interactions between the plurality of shot clusters.

* * * * *

UNITED STATES PATENT AND TRADEMARK OFFICE
CERTIFICATE OF CORRECTION

PATENT NO. : 9,912,974 B2
APPLICATION NO. : 15/057455
DATED : March 6, 2018
INVENTOR(S) : Farré Guiu et al.

It is certified that error appears in the above-identified patent and that said Letters Patent is hereby corrected as shown below:

In the Claims

In Column 14, Line 18, in Claim 14, after "claim 13," delete "wherein the".

Signed and Sealed this
Thirty-first Day of July, 2018

Andrei Iancu
*Director of the United States Patent and Trademark Office*